United States Patent
Ghosh et al.

(10) Patent No.: US 6,902,798 B2
(45) Date of Patent: Jun. 7, 2005

(54) HIGH TEMPERATURE GAS SEALS

(75) Inventors: Debabrata Ghosh, Calgary (CA); Scott Thompson, Calgary (CA)

(73) Assignee: Fuelcell Energy, Ltd., Calgary (CA)

( * ) Notice: Subject to any disclaimer, the term of this patent is extended or adjusted under 35 U.S.C. 154(b) by 57 days.

(21) Appl. No.: 09/931,415

(22) Filed: Aug. 17, 2001

(65) Prior Publication Data

US 2002/0024185 A1 Feb. 28, 2002

Related U.S. Application Data

(60) Provisional application No. 60/224,801, filed on Aug. 18, 2000.

(51) Int. Cl.[7] .............................. B32B 5/22; D21H 13/00
(52) U.S. Cl. ................ 428/317.9; 428/311.11; 428/311.51; 428/312.6; 428/312.8; 428/920
(58) Field of Search .................. 428/311.11, 311.51, 428/312.6, 317.9, 920, 312.8

(56) References Cited

U.S. PATENT DOCUMENTS

| | | |
|---|---|---|
| 4,390,583 A | 6/1983 | Brazel |
| 4,568,594 A | 2/1986 | Hordonneau et al. |
| 4,650,621 A * | 3/1987 | Sago et al. .................. 264/621 |
| 4,828,774 A | 5/1989 | Andersson et al. |
| 5,041,321 A | 8/1991 | Bendig |
| 5,078,818 A | 1/1992 | Han et al. |
| 5,080,963 A | 1/1992 | Tatarchuk et al. |
| 5,102,745 A | 4/1992 | Tatarchuk et al. |
| 5,106,790 A | 4/1992 | Hashimoto et al. |
| 5,198,282 A | 3/1993 | Baker et al. |
| 5,304,330 A | 4/1994 | Tatarchuk et al. |
| 5,468,358 A | 11/1995 | Ohkawa et al. |
| 5,512,351 A | 4/1996 | Miyamiuchi et al. |
| 5,552,049 A | 9/1996 | Gray |
| 5,589,441 A | 12/1996 | Baker et al. |
| 5,955,177 A | 9/1999 | Sanocki et al. |
| 5,990,027 A * | 11/1999 | Mercuri et al. ................ 501/99 |
| 5,993,905 A | 11/1999 | Shechan |

FOREIGN PATENT DOCUMENTS

| | | |
|---|---|---|
| JP | 01163055 | 6/1989 |
| JP | 01163057 | 6/1989 |
| JP | 04027948 | 2/1992 |
| JP | 05154960 | 6/1993 |
| JP | 05182511 | 7/1993 |
| JP | 06116067 | 5/1994 |
| JP | 11083862 | 3/1999 |

OTHER PUBLICATIONS

Translation of JP 3–28288, Numamoto et al, Feb. 6, 1991, 15 pages.*

* cited by examiner

Primary Examiner—Terrel Morris
Assistant Examiner—Hai Vo
(74) Attorney, Agent, or Firm—Bennett Jones LLP

(57) ABSTRACT

A flexible seal for use in a solid oxide fuel cell stack is formed from a fiber matrix impregnated with a plurality of solid particles. The fibers and particles are preferably ceramic and may be formed from alumina or zirconia. The seal may be formed by dipping the fiber matrix into a slurry of the particles in an alcohol, drying the seal and precompressing prior to installation in the fuel cell stack.

8 Claims, 6 Drawing Sheets

HIGH TEMPERATURE GAS SEALS

This application claims benefit of U.S. Provisional 60/224,801 filed Aug. 18, 2000.

BACKGROUND OF THE INVENTION

The present invention relates to high temperature gas seals, particularly for use in the cells of a solid oxide fuel cell stack.

A planar solid oxide fuel cell (SOFC) stack has three primary constituents, a ceramic electrochemical cell membrane, metallic interconnects, and an arrangement of seals. To perform the function of converting chemical energy into electrical energy, a SOFC membrane must have one electrochemical face exposed to an oxidant gas, and the other exposed to a fuel gas, all at an operating temperature at or above 600° C. A metallic interconnect provides fuel and oxidant gas distribution to the cells by means of separate plenums, and when arranged between cells in a fuel stack arrangement, also transfers electrical current from one cell to another. The seals required between a cell and an interconnect in a SOFC stack must provide adequate resistance to gas permeation to contain the reactants within the gas distribution plenum, as well as provide adequate electrical isolation between the cell and interconnect. The seal should preferably resist significant degradation over time, and it should preferably be capable of being thermally cycled.

Conventional sealing methods all have disadvantages for use in planar SOFC stacks. Most prior art seals are glass which has been crystallized between the two members to be sealed, forming a brittle gas tight seal. The difficulties with glass seals arises from the need to thermally cycle the stack from room temperature to operating temperatures of 700–900° C. The various stack components tend not to have their coefficients of thermal expansion perfectly matched, thus stresses arise during thermal cycling of the cell. Even if the coefficients of thermal expansion are matched, the rates of thermal conductivities within a stack are typically not matched, resulting in non-uniform thermal expansion. As glass is inherently brittle, it cracks and fails under thermal cycling conditions. The brittleness of glass also makes glass seals subject to failure as a result of jarring shocks or vibrations. This is often the case in cells used in motor vehicles. A further disadvantage of glass seals is chemical incompatibity with electrocatalytic cells, which leads to power degradation under operation. A SOFC is particularly sensitive to alkali elements contained in many glass seals which can detrimentally affect the SOFC catalyst.

Other prior art seals have been made of mica, and while being able to withstand the high temperature, they are typically unable to provide an adequate seal to keep the fuel cell input gases separated. In addition, it has been found that the mica may leach minerals into the cell and poison the catalyst. Further problems have been found with the natural variance in thickness of mica sheets and the relative non-compressibility of the mica. Both of these factors prevent an effective seal from forming.

Therefore, there is a need in the art for a seal suitable for use in a SOFC which mitigates the difficulties found in the prior art.

SUMMARY OF THE INVENTION

The present invention is directed to a gasket type sealing element for sealing the cells in a SOFC from each other which are effective under the harsh operating environment in which the cells are required to operate.

In accordance with one aspect of the present invention, there is provided a seal for sealing solid oxide fuel cells from adjoining cells within a SOFC stack, and sealing the input gases from each other whilst moving through the stack. In one embodiment, the seal comprises a matrix of ceramic fibres and a plurality of solid particles interspersed between the ceramic fibres.

In one embodiment, the seal further comprises a binder material which may preferably be an inorganic binder. The fibres may be randomly oriented. In a preferred embodiment, the seal may be precompressed prior to use.

The ceramic fibres may be selected from the group comprising alumina, zirconia, titania, magnesia or silica. The solid particles may be ceramic particles, glass particles or other inert materials able to resist degradation and sintering at the operating temperatures of the SOFC stack. If the particles are ceramic particles, the particles may be selected from the group comprising alumina, zirconia, titania, magnesia or silica.

In one embodiment, a substantial portion or all of the particles are submicronic ceramic particles. Preferably, the particles have a particle size of about 0.50 μm or less. More preferably, the ceramic particles comprise a first portion and a second portion wherein the particle size of the first portion is larger than the particle size of the second portion. The first portion may have a particle size of about 0.50 μm and the second portion may have a particle size of about 0.17 μm or less. In another embodiment, the first portion may have a particle size of about 0.50 μm and the second portion may have a particle size of less than about 0.06 μm. The proportion of larger particles to smaller particles may be varied to achieve maximum sealing performance.

BRIEF DESCRIPTION OF THE DRAWINGS

The invention will now be described by way of exemplary embodiments with reference to the accompanying simplified, diagrammatic, not-to-scale drawings. In the drawings.

DETAILED DESCRIPTION OF THE INVENTION

The present invention provides for a flexible seal suitable for use in a solid oxide fuel cell operating in excess of 600° C. and which experiences thermal cycling. When describing the present invention, the following terms have the following meanings, unless indicated otherwise. All terms not defined herein have their common art-recognized meanings.

The term "ceramic" refers to inorganic non-metallic solid materials with a prevalent covalent or ionic bond including, but not limited to metallic oxides (such as oxides of aluminium, silicon, magnesium, zirconium, titanium, chromium, lanthanum, hafnium, yttrium and mixtures thereof) and non-oxide compounds including but not limited to carbides (such as of titanium, tungsten, boron, silicon), silicides (such as molybdenum disicilicide), nitrides (such as of boron, aluminium, titanium, silicon) and borides (such as of tungsten, titanium, uranium) and mixtures thereof; spinels, titanates (such as barium, lead, lead zirconium titanates, strontium titanate, iron titanate), ceramic super conductors, zeolites, ceramic solid ionic conductors (such as yittria stabilized zirconia, beta-alumina and cerates).

Figure 1:
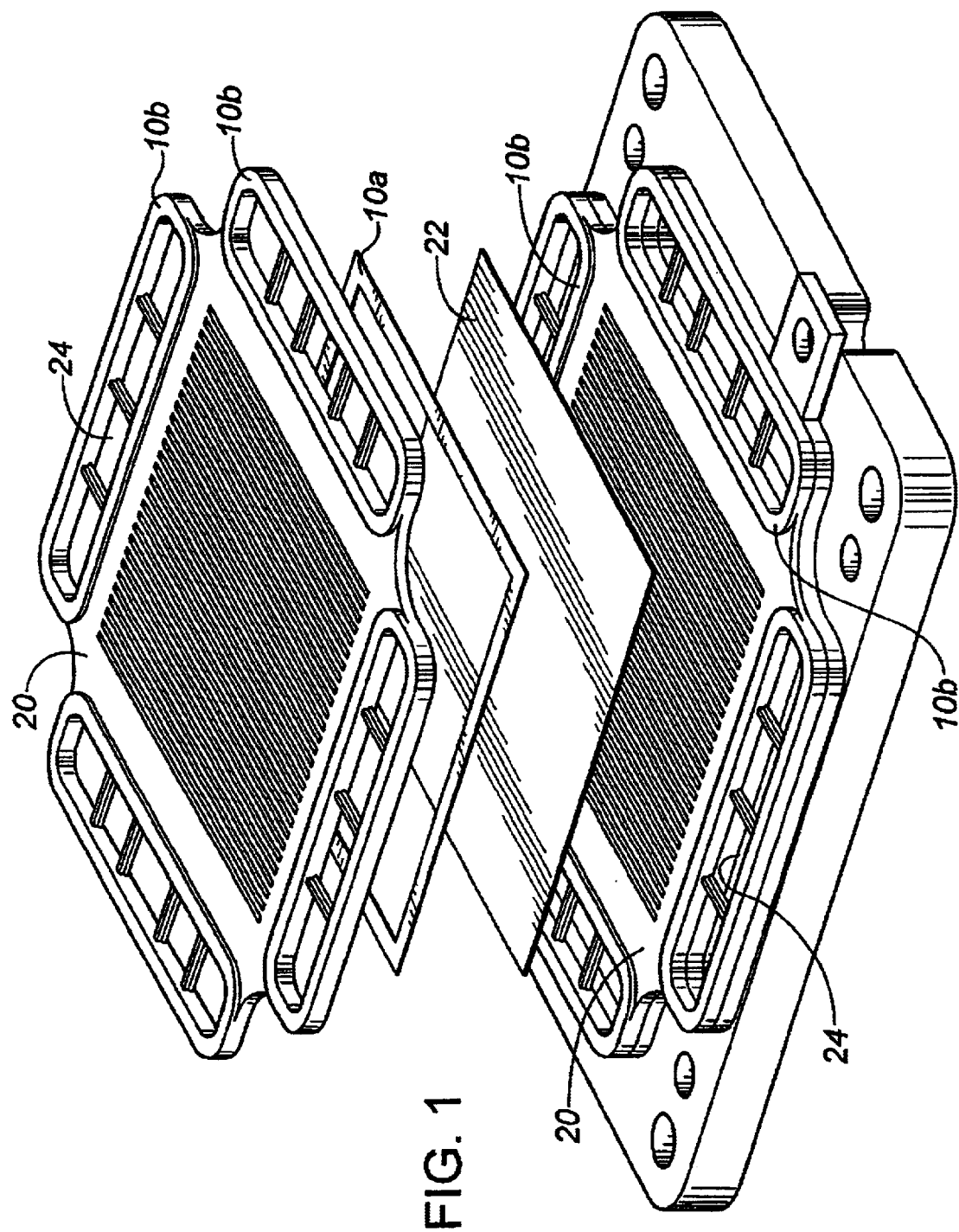
FIG. 1 is a view of a fuel cell arrangement, showing seals of the present invention in position.

In FIG. 1 a portion of a fuel cell stack is illustrated. A seal (10a) is shown fitted between two interconnects (20), and a fuel cell (22). Seals (10b) are also shown surrounding the gas manifolds (24), which conduct the fuel and air separately to the cell. It is important to keep these two gas flows sealed inside their respective manifolds, for both efficiency and safety reasons. The seals (10a, 10b) of the present invention are not limited to seals having the shape or configuration illustrated nor is the configuration of the fuel cell stack intended to limit the claimed invention in any manner.

Figure 2:
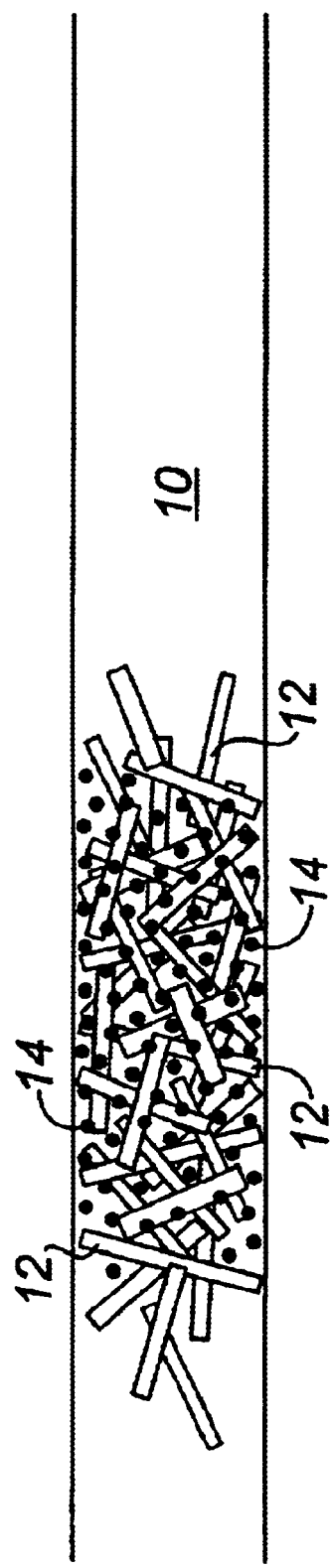
FIG. 2 is a cross section view in somewhat schematic form of the seal of the present invention.

Referring to FIG. 2, there is illustrated a schematic cross-section of a seal (10) comprised of a matrix of ceramic fibres (12) and a plurality of ceramic particles (14) interspersed within the fibre matrix (12). Both the fibres (12) and particles (14) may be any suitable ceramic material. A suitable ceramic material is preferably inert or chemically compatible with the fuel cell environment, the interconnect and the fuel cell gases and will preferably resist sintering at the operating temperature of the fuel cell. The fibres should be capable of remaining flexible at the cell's operating temperature, and retaining the ceramic filler particles within the fibre matrix. The fibres and particles should also not sinter at operating temperature and the particles should be capable of filling the voids in the fibre matrix sufficiently to form a seal that is substantially impervious to the stack gases.

The fibres and the filler particles may be alumina,zirconia, titania,magnesia or other suitable ceramic material or mixtures of suitable ceramic materials. Silicas are also potentially useable however, they are not indicated for most applications because of their tendency to react with hydrogen and vapourize. In one embodiment, the fibres are alumina, and the filler particles are either zirconia or alumina. Many other combinations are possible and the choice of suitable ceramic materials would be well within the skill of one skilled in the art.

Metal fibres or particles may be used but are not preferred because of their electrical conductivity, tendency to be unstable or oxidize at fuel cell operating temperatures and their tendency to sinter or coalesce at those temperatures. Nevertheless, certain metals may be utilized in certain applications in substitution for a ceramic material.

The fibre matrix may be formed from randomly oriented fibres formed into a highly porous mat or felt. Alternatively, the fibres may be woven or oriented in some manner. In one embodiment, the fibre matrix may have about 90% porosity and have a density in the range of about 4 to about 15 pounds/ft$^3$. The fibre matrix is thus highly compressible. Even when highly compressed, the fibre matrix by itself performs very poorly as a sealing element. In the present invention, it is the combination of the particles within the fibre matrix which provides adequate sealing performance. When the seal is compressed in the fuel cell stack, or precompressed,the particles block the potential leakage paths and provide a non-hermetic but effective seal. Because the ceramic components of the seal are not sintered, the seal may flex or experience thermal expansion or contraction without breaking down. As well, the seal is not affixed to the contact surfaces of the cell, thereby allowing various parts of the cell in contact with the seal to slide past each other as they move due to thermal differences. This also allows the seal to resist vibrations, such as may be encountered in an automotive environment.

In a preferred embodiment, the seals of the present invention may be compressed prior to usage in a SOFC stack. A large performance gain may be achieved with a precompressed seal over a seal that was not precompressed because the compressive force achieved in a precompression step may be higher than that achieved within a fuel cell stack . The seal may be compressed in a hydraulic press, and while sealing performance increased with greater precompression, so may the difficulty in retrieving the seal from the press after being compressed, due to the tendency of the seal to stick to the platen of the press. Various well-known methods are available to reduce the sticking. Preferred methods include the use of release materials such as non-stick coatings or sheets of paper between the press platen and the seal.

Figure 3:
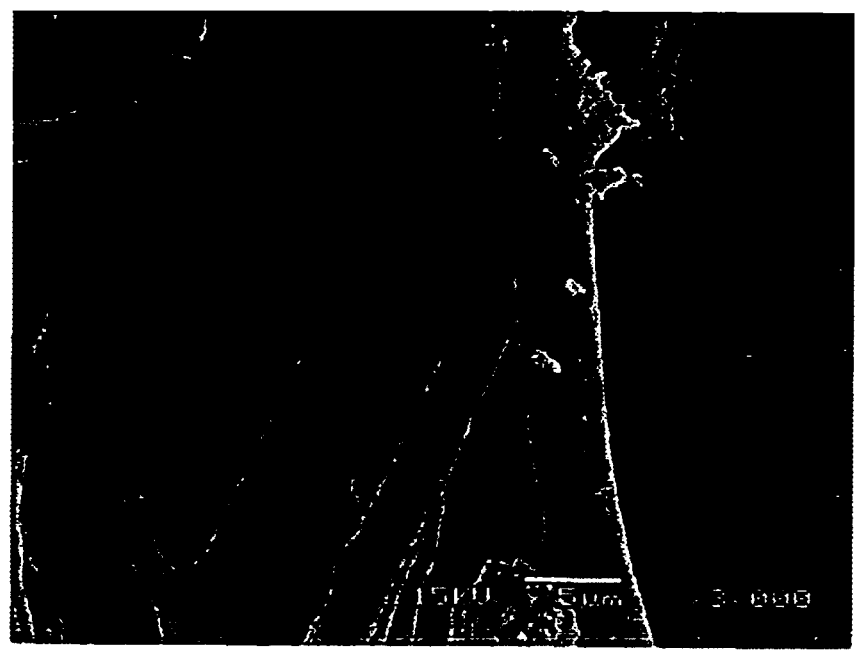
FIG. 3 is a scanning electron micrograph (SEM) photo of an alumina fibre matrix prior to particle loading at 3000× magnification.
Figure 4:
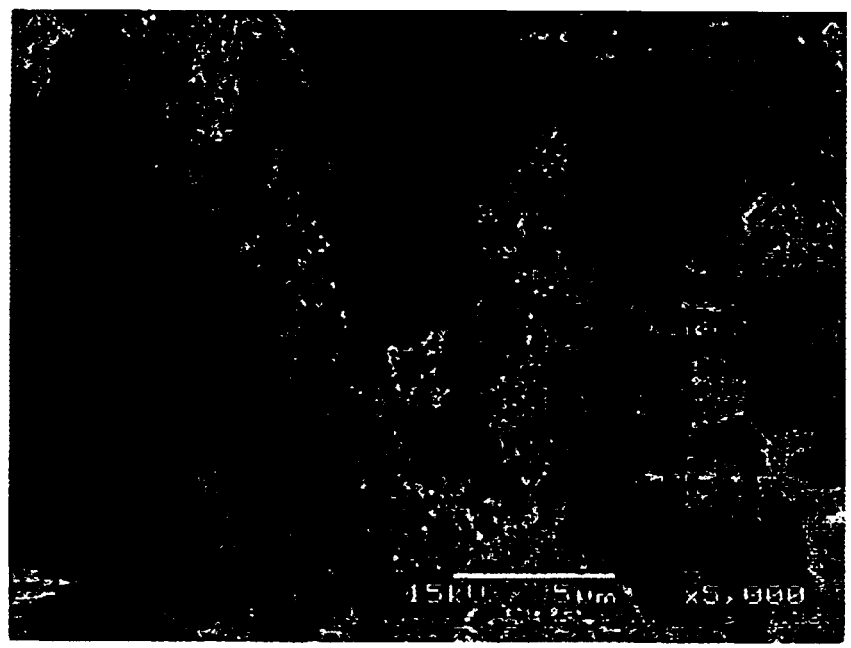
FIG. 4 is a SEM photo of the alumina fibre matrix after being loaded with zirconia particles, prior to compression, at 5000× magnification.
Figure 5:
FIG. 5 is a SEM photo of the loaded alumina fibre matrix at 1000× magnification.
Figure 6:
FIG. 6 is a SEM photo of the loaded alumina fibre matrix after precompression at 10,000× magnification.

FIG. 3 shows a microphotograph of a fibre (14) matrix in the form of a commercially available alumina fibre paper, as received from the manufacturer in their uncompressed state, and without the ceramic particles. The large spaces in between the fibres allow leak pathways for the fuel cell gasses, and thus a poor seal. As referred to above, this difficulty is overcome by filling the voids in the matrix with small ceramic particles (16) which are visible in the photographs in FIGS. 4, 5 and 6. FIG. 4 shows the fibres at 5,000× magnification and demonstrates how the particles (16) surround and pack around the fibres (14), and fill the voids in the matrix. FIG. 5 shows the fibres and powders at a 1,000× magnification, and demonstrates a light packing of the fibres with powders, prior to compression. FIG. 6 demonstrates the fibre matrix loaded with zirconia particles at 10,000× magnification, and shows how the powder particles have adhered to the fibres, after compression of the seal into a denser matrix.

It is not intended that the seal of the present invention provide a hermetic seal. An effective seal is formed when the ceramic powder within the fibre matrix is compressed sufficiently dense to create a very torturous leak path for the gases. The fibre matrix acts as a physical restraint to the ceramic powder, allowing the shape to be formed and maintained throughout its service life. The ceramic powder is very tightly packed into the alumina matrix, but is not sintered into a contiguous member and remains unsintered at the operating temperatures of the fuel cell, which may be typically in the range of 600° C. to 800° C. The seal thus retains some flexibility.

Preferably, the ceramic particles are uniformly submicron in size and may comprise zirconia or alumina particles. In one preferred embodiment, the particles are about 0.5 μm in diameter or less. In another embodiment, the particles are about 0.17 μm in diameter or less. Surprisingly good results were achieved in an embodiment comprising a mixture of larger (0.5 μm) particles and smaller (0.17 μm) particles. In one preferred embodiment, a suspension made up of 8% by volume suspension of larger zirconia particles and 8% by volume smaller zirconia particles, mixed in a ratio of 55:45 larger particle suspension to smaller particle suspension, resulted in a very effective seal. In another embodiment, a mixture of larger (0.5 μm) particles and extremely small (0.02 μm to 0.06 μm) particles also produced an effective seal.

The resulting seal may have any suitable thickness which is largely dependent on the thickness of the fibre matrix before impregnation with the particles. In one embodiment, the seals may vary in thickness from about 0.020" to about 0.067" (0.51 mm to about 1.70 mm) prior to precompression. If the seals are precompressed, they may be compressed down to a thickness of about 0.008" (0.20 mm)

The seals may be formed by any suitable process. The seal may be formed by first making an alumina felt from short alumina fibres and then forming and rolling into a sheet to a desired thickness. Suitable alumina fibre felts or ceramic papers are commercially available, such as Kaowool™ available from Thermal Ceramics, Augusta, Ga. Kaowool™ contains a small proportion of silica fibres and an organic binder. The organic binder will vapourize or burn on first use as a result of the elevated fuel cell operating temperature. After forming, the felt is soaked in a suspension of zirconia powder in a liquid media such as an alcohol. The liquid media may be any liquid but preferably should have low surface tension and be relatively volatile to allow quick evaporation. Alcohols such as ethanol and isopropanol are effective liquid media for this purpose. The zirconia powder is drawn into the matrix of the felt by the capillary action of the felt, and thus creating a reasonably dense sealing media. After absorption of the zirconia powder, the felt is dried to remove the ethanol and the felt is cut or punched to the required size and shape of seal desired. The seal may then be precompressed prior to installation or it may be precompressed prior to cutting or punching.

In one alternative method, the seals may be vacuum formed in a mould. In this method, a mould of the required shape is made from perforated stainless steel. A slurry of fibres, particles, liquid media, a dispersant, an organic binder, and an inorganic binder are mixed and poured into the mould, where it is compressed under vacuum to the desired shape. After forming, the seal is ejected from the mould and baked in a continuous tunnel oven. After being ejected from the mould, the organic binders hold the seal to shape and then burn off in the oven. During baking, the inorganic binders take over, and hold the seal to its final shape after firing. The inorganic binder has sintered to hold the fibres and particles together, yet the particles and fibres themselves have not sintered.

In an alternative embodiment, a sol-gel process can be used to form very small particles in the fibre matrix. The sol process can form very small ceramic particles, and this allows a high penetration of the ceramic particles into the fibre matrix. The preparation of a sol is well known in the art. Suitable ceramic sols are also commercially available. For example, alumina sol-gels may be formed from the acid hydrolysis of organo-metallic aluminum compounds such as carboxylate substituted alumoxanes. The sol particles are produced by adding carefully measured amounts of water to the sol while mixing. This creates a pH shift, and causes very small, uniform alumina particles to form, resulting in a colloidal dispersion. The colloidal dispersion may then be used in the same manner as the suspended powder referred to above. Alternatively, the particles may be reclaimed by centrifugation or filtering and resuspended in a suitable liquid media such as an alcohol.

By use of the sol process, smaller ceramic particles create a higher level of packing of particles within the seal. This higher level of packing will more completely fill the voids in the fibre matrix, and create a more torturous path for the gasses as they attempt to flow through the seal. This will result in a seal with a lower leak rate and higher performance. The sol process may be used in conjunction with the dipping and alumina particles described herein above, since the sol-gel process is much more expensive than the alumina particles. When used in conjunction with the alumina particles, the combined alumina—sol gel process produces packing of approximately 80% of the space between the alumina fibres. The dipping with alumina particles can produce a theoretical maximimum packing of 64%.

The sol-gel process produces particles that are approximately an order of magnitude smaller than the alumina particles used in the dipping process, and these small particles fill the intergranular spaces left between the alumina particles and fibres. The difference in size between the two types of particles creates a higher level of packing, and thus a denser finished seal. It is this increased density which has correspondingly lower porosity, that contributes to a seal with a lower leak rate than known seals.

The sol-gel process is much more expensive than the dipping with alumina particles process but may produce more effective seals. A reasonable cost-performance compromise may be achieved by combining alumina powder and alumina sol to produce a seal having a first portion of larger alumina particles and a second portion of very small alumina particles. Therefore, in one embodiment, a slurry of alumina sol particles formed as described above and alumina particles is used. The alumina particles are approximately 0.5 m, and those from the sol are approximately 0.05 m, in the range of about 0.02 $\mu$m to about 0.06 $\mu$m. The carrier fluid can be isopropanol, which is water free.

The slurry's viscosity is adjusted to the desired viscosity by adding liquid media. In one example, the volume ratio of the alumina in the sol to alumina powder is maintained at about 1:3 although this ratio may be varied to vary the proporation of smaller particles to larger particles in the seal.

An appropriately sized piece of alumina felt is then dipped in the slurry, and the particles contained within the slurry are absorbed into the inter-fibre spaces of the alumina felt. After dipping, the felt seal is dried to remove the alcohol; the seal is compressed, and then punched in a die to the required size.

In an alternative embodiment, particles of finely ground glass can be added to the alumina particles to create the dipping slurry. At the temperatures encountered during fuel cell operation, the glass will soften and form a pliant seal. The glasses can be chosen by those skilled in the art such that the particles will not melt, but merely soften. This avoids the brittleness of known glass seals, since the glass particles do not melt and form a homogenous seal.

The specific methods of forming the seals described herein are not intended to limit the claimed invention unless specifically claimed in that manner below.

As will be apparent to those skilled in the art, various modifications, adaptations and variations of the foregoing specific disclosure can be made without departing from the scope of the invention claimed herein.

What is claimed is:

1. A seal for use in a solid oxide fuel cell comprising a matrix of ceramic fibres and a plurality of solid particles impregnated within the matrix and interspersed between the ceramic fibres, wherein the fibres and solid particles are unsintered and wherein the fibres and particles combine to form a flexible and compressible seal which is substantially but not hermetically gas-tight, wherein a substantial portion of the particles have a particle size less than about 1 micron, and wherein the solid particles comprise a first portion and a second portion, wherein the average particle size of the first portion is larger than the average particle size of the second portion.

2. The seal of claim 1 wherein the first portion has an average particle size of about 0.50 micron and the second portion has an average particle size of about 0.17 micron or less.

3. The seal of claim 1 wherein the fibres are randomly oriented.

4. The seal of claim 1 wherein the seal is compressed prior to installation into a fuel cell stack.

5. The seal of claim 1 wherein the solid particles comprise ceramic particles.

6. The seal of claim 1 wherein some or all of the ceramic fibres comprise alumina, zirconia, titania, magnesia or silica.

7. The seal of claim 6 wherein the fibres comprise alumina and the particles comprise alumina or zirconia.

8. The seal of claim 1 wherein some or all of the ceramic particles comprise alumina, zirconia, titania, magnesia or silica.

* * * * *